(12) United States Patent
Mitsutani

(10) Patent No.: US 8,103,396 B2
(45) Date of Patent: Jan. 24, 2012

(54) ELECTRIC POWERED VEHICLE AND ITS CONTROL METHOD

(75) Inventor: Noritake Mitsutani, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 434 days.

(21) Appl. No.: 12/312,817

(22) PCT Filed: Dec. 21, 2007

(86) PCT No.: PCT/JP2007/075349
§ 371 (c)(1),
(2), (4) Date: May 28, 2009

(87) PCT Pub. No.: WO2008/090723
PCT Pub. Date: Jul. 31, 2008

(65) Prior Publication Data
US 2010/0030412 A1  Feb. 4, 2010

(30) Foreign Application Priority Data

Jan. 25, 2007 (JP) ................... 2007-015047

(51) Int. Cl.
*B60L 11/00* (2006.01)
(52) U.S. Cl. .................... 701/22; 318/139; 180/65.1
(58) Field of Classification Search ............ 701/22; 318/139; 180/65.1
See application file for complete search history.

(56) References Cited

U.S. PATENT DOCUMENTS

| 5,619,107 A | 4/1997 | Shinohara et al. |
| 5,796,224 A | 8/1998 | Hayashi et al. |
| 2005/0203678 A1 * | 9/2005 | Suzuki et al. ............ 701/22 |

FOREIGN PATENT DOCUMENTS

| JP | A-08-033103 | 2/1996 |
| JP | A-08-308003 | 11/1996 |
| JP | A-10-257604 | 9/1998 |
| JP | A-2000-333468 | 11/2000 |
| JP | A-2006-087175 | 3/2006 |

* cited by examiner

*Primary Examiner* — Thomas Black
*Assistant Examiner* — Luke Huynh
(74) *Attorney, Agent, or Firm* — Oliff & Berridge, PLC

(57) ABSTRACT

A shift position of an electric powered vehicle is selected by operating a shift lever and a P position switch. A power source position is selected by operating a power switch. When any of switching elements forming an inverter device is short-circuited, selection of the shift position and the power source position is controlled such that simultaneous selection of a power source position at which inverter control is turned off and a shift position at which a parking lock mechanism is inactivated can be avoided. Therefore, inverter control for reducing short-circuit current caused by back electromotive force derived from rotation of a motor generator after occurrence of short-circuit failure can reliably be executed.

14 Claims, 8 Drawing Sheets

ELECTRIC POWERED VEHICLE AND ITS CONTROL METHOD

TECHNICAL FIELD

The present invention relates to an electric powered vehicle capable of running with driving force generated by an AC electric motor generator and a method of controlling the same. More specifically, the present invention relates to a method of preventing any damage resulting from back electromotive force of the AC electric motor generator.

BACKGROUND ART

Recently, electric powered vehicles such as a hybrid vehicle and an electric vehicle have attracting attention as environmentally friendly vehicles. Such an electric powered vehicle includes a power storage device formed of a secondary battery or the like, and a motor generator as a motor for driving the vehicle, and is capable of generating driving force, upon receiving electric power from the power storage device. The motor generator generates the driving force at the time of starting or acceleration, and converts kinetic energy of the vehicle to electric energy and recovers it to the power storage device at the time of regenerative braking. In order to control the motor generator in accordance with the state of running of the vehicle as described above, a general electric powered vehicle has a power converting device allowing power conversion between the power storage device and the motor generator through switching control of a power semiconductor switching element in an inverter device or the like.

In order to cope with a failure of the power semiconductor switching element in such an inverter device, Japanese Patent laying-Open No. 2000-333468 (hereinafter referred to as Patent Document 1) discloses an inverter device formed of IGBTs (Insulated Gate Bipolar Transistors) as the power semiconductor switching elements (hereinafter also simply referred to as "switching elements") provided with an element protective part for individually cutting off each IGBT in case of abnormality such as overheating. Further, the document discloses provision of an inverter device adapted to selectively use a mode in which the element protective part executes individual cut-off (self cut-off) and outputs an abnormality signal to an external control unit and a mode in which the abnormality signal is output to the external control unit without executing individual cut-off, thereby preventing degradation of element protecting function and realizing convenience for use.

If, in an electric powered vehicle, a short-circuit failure occurs in the inverter device controlling driving of a motor generator for driving the vehicle, normal running becomes impossible and, in some cases, the vehicle must be towed to a repair garage. If the motor generator is implemented by a permanent magnet motor having a permanent magnet attached to a rotor, back electromotive force generates as the rotor rotates while the vehicle is towed. This must be addressed.

In this regard, Japanese Patent Laying-Open No. 10-257604 (hereinafter referred to as Patent Document 2) discloses a controlling device for an electric vehicle that prevents damage caused by the back electromotive force of the running motor when the electric vehicle runs downhill by gravity or when the vehicle is towed after a short-circuit occurred in the inverter device. Specifically, a control structure is disclosed in which, if the number of rotations of a running motor is equal to or higher than a reference value, it is determined that the electric vehicle is being towed or running downhill by gravity, and a main contactor, connected between a power source such as a battery and the inverter device, is kept off, so as to prevent any damage to the contactor.

Further, Japanese Patent Laying-Open No. 8-33103 (hereinafter referred to as Patent Document 3) discloses a control structure limiting discharge from a smoothing capacitor connected in parallel with the inverter device forming the motor driving means, when a towing state, in which the electric powered vehicle is towed, is detected. This prevents heating of a discharging circuit of the smoothing capacitor in the towing state, in which regenerative power of motor generates.

Japanese Patent Laying-Open No. 2006-87175 (hereinafter referred to as Patent Document 4) discloses a vehicle controller that issues an instruction to the driver to inhibit towing of the vehicle and operates a brake to stop tow-running, if a short-circuit occurred in a motor drive circuit or the like.

As described above, in an electric powered vehicle having a permanent magnet type motor as a motor for driving the vehicle, if a driving wheel rotates in tow running, for example, a rotor in the permanent magnet type motor coupled to the driving wheel rotates and generates back electromotive force. This results in short-circuit current in a short-circuit loop formed by the short-circuited switching element, an anti-parallel diode of a different phase, and a coil winding of a motor generator. Particularly, when the short-circuit failure of the switching element occurs only in one or more phases and not in all phases of the inverter device, the short-circuit current flows concentrated in a specific phase, resulting in excessive current and possibly results in more significant damage to the device.

The short-circuit current between the motor generators and in the inverter device as such cannot be prevented by the structures of Patent Documents 1 to 3. Patent Document 4 inhibits towing of the vehicle without exception when short-circuit failure occurs and thereby prevents damage to the device caused by excessive short-circuit current, while disadvantageously lowers convenience to the driver.

DISCLOSURE OF THE INVENTION

The present invention was made to solve the above-described problem and its object is to provide an electric powered vehicle having a control structure capable of reliably executing inverter control in which generation of excessive short-circuit current is prevented even when the motor generator rotates after a short-circuit failure occurred in a power semiconductor switching element forming the inverter device, for example, during tow-running, and to provide a control method thereof.

The present invention provides an electric powered vehicle including an AC electric motor generator, an inverter device, a controller, a shift position selecting unit, a parking lock mechanism, a power source position selecting unit, and an overlapped state avoiding unit. The AC electric motor generator has a rotor with a magnet attached, and is configured to allow alternate transmission of rotating force to/from a wheel. The inverter device has a plurality of power semiconductor switching elements, and is configured to convert a DC voltage of a power source to a driving voltage for the AC electric motor generator. The controller controls the inverter device. The shift position selecting unit selects one of a plurality of shift positions including at least a parking position, in accordance with an operation by a driver. The parking lock mechanism is activated when the parking position is selected. The power source position selecting unit selects one of a plurality of power source positions determining a group of devices to be objects of power supply among devices mounted on the vehicle, in accordance with an operation by the driver. The plurality of power source positions include a first power source position allowing control of the power semiconductor switching element by the controller and a second power source position not allowing the control. The overlapped state avoiding unit avoids a state in which selection of the second power source position and selection of a shift position at which the parking lock mechanism is inactive are overlapped, when a short-circuit failure of any of the plurality of power semiconductor switching elements has been detected.

In the method of controlling an electric powered vehicle in accordance with the present invention, the electric powered vehicle includes an AC electric motor generator, an inverter device, a controller, a shift position selecting unit, a parking lock mechanism, and a power source position selecting unit, as described above. The control method includes the steps of determining whether or not a short-circuit failure of any of the plurality of power semiconductor switching elements has been detected; and avoiding, when it is determined that the short-circuit failure has been detected, a state in which selection of the second power source position and selection of a shift position at which the parking lock mechanism is inactivated, are overlapped.

According to the electric powered vehicle and the control method described above, when a short-circuit failure of the switching element occurs and normal running becomes impossible, simultaneous selection of a power source position (second power source position) at which inverter control is turned off, and a shift position at which parking lock mechanism is inactive and wheel rotation is possible (that is, shift position allowing towing) is avoided. Therefore, after the occurrence of a short-circuit failure, if the rotor of AC electric motor generator rotates, typically in tow running, a power source position (first power source position) allowing on/off control of remaining normal switching element or elements is reliably selected. Therefore, a short-circuit current reduction that forms, in the inverter device, a current path not causing concentration of short-circuit current to a specific phase, can reliably be effected. As a result, generation of excessive short-circuit current by the back electromotive force of AC electric motor generator and associated further damage to the device can be prevented at the time of towing.

Preferably, the plurality of power semiconductor switching elements are arranged as upper and lower arm elements of a plurality of phases forming the inverter device. When the short-circuit failure has been detected and the vehicle is towed, the controller turns on, in each phase at which the short-circuit failure has not occurred among the plurality of phases, an arm element of the same side as the short-circuited power semiconductor switching element, among the upper and lower arm elements.

This arrangement enables short-circuit current reducing control in which a current path that splits short-circuit current caused by back electromotive force of AC electric motor generator during towing to phases of the inverter device is formed. Specifically, generation of excessive short-circuit current can be prevented during towing at the time of short-circuit failure, without necessitating any new control device such as a relay.

More preferably, the electric powered vehicle further includes an instructing unit. The instructing unit recognizes, when vehicle speed of the electric powered vehicle attains to a prescribed speed or higher when the first power source position is selected and a neutral position is selected as the shift position, that the vehicle is being towed, and instructs the controller to execute the short-circuit current reducing control. The control method further includes the step of recognizing, when vehicle speed of the electric powered vehicle attains to a prescribed speed or higher when the first power source position is selected and a neutral position is selected as the shift position, that the vehicle is being towed, and instructing the controller to execute the short-circuit current reducing control.

By this arrangement, it becomes possible to recognize, when the neutral position (N position) is selected and vehicle speed of the electric powered vehicle attains to a prescribed speed or higher, that the vehicle is being towed, and to execute the short-circuit current reducing control.

Preferably, the overlapped state avoiding unit includes a warning unit and a suspending unit. The warning unit is formed to urge selection of the parking position, when an operation is made to instruct transition from the first power source position to the second power source position while a shift position at which the parking lock mechanism is inactive is selected. The suspending unit is formed to suspend, after the warning unit urged selection of the parking position until the parking position is actually selected, transition by the power source position selecting unit from the first power source position to the second power source position. Alternatively, the avoiding step includes the steps of urging selection of the parking position, when an operation is made to instruct transition from the first power source position to the second power source position while a shift position at which the parking lock mechanism is inactive is selected, and suspending, after selection of the parking position is urged at the urging step until the parking position is actually selected, transition by the power source position selecting unit from the first power source position to the second power source position.

By this arrangement, it becomes possible when an operation is done to make a transition to the second power source position turning off the inverter control while the parking lock mechanism is inactive, that is, while the shift position allowing towing is being selected, to keep transition of the power source position suspended until the shift position is switched to the parking position. Therefore, simultaneous selection of the power position at which inverter control is turned off and the shift position allowing rotation of a wheel (allowing towing) can be avoided.

Preferably, the overlapping state avoiding unit includes an automatic selecting unit. The automatic selecting unit is formed to cause the power source position selecting unit to automatically select the parking position, when an operation instructing transition from the first power source position to the second power source position is made while a shift position at which the parking lock mechanism is inactive is being selected. Alternatively, the avoiding step includes the step of causing the power source position selecting unit to automatically select the parking position, when an operation instructing transition from the first power source position to the second power source position is made while a shift position at which the parking lock mechanism is inactive is being selected.

By this arrangement, it becomes possible, when an operation is done to make a transition to the second power source position turning off the inverter control while the parking lock mechanism is inactive, that is, while the shift position allowing wheel rotation (allowing towing) is being selected, to automatically switch the shift position to the parking position. Therefore, simultaneous selection of the power source position turning off the inverter control and the shift position allowing towing can be avoided.

Preferably, the overlapped state avoiding unit includes an automatic selecting unit. The automatic selecting unit is formed to cause the power source position selecting unit to select the first power source position, when a shift position at which the parking lock mechanism is inactivated is selected while the second power source position is being selected. Alternatively, the avoiding step includes the step of causing the power source position selecting unit to automatically select the first power source position when a shift position at which the parking lock mechanism is inactivated is selected while the second power source position is being selected.

By this arrangement, it becomes possible, when the shift position at which the parking lock mechanism is inactivated is selected while the second power source position turning off the inverter control is selected, to automatically set the first power source position that allows inverter control. Therefore, simultaneous selection of the power source position turning off the inverter control and the shift position allowing wheel rotation (allowing towing) can be avoided.

Preferably, the overlapped state avoiding unit includes a warning unit and a suspending unit. The warning unit is formed to urge selection of the first power source position when an operation releasing the parking position is made while the second power source position is being selected. The suspending unit is formed to suspend, after the warning unit urged selection of the first power source position until the first power source position is actually selected, releasing of the parking position by the shift position selecting unit. Alternatively, the avoiding step includes the steps of urging selection of the first power source position when an operation releasing the parking position is made while the second power source position is being selected, and suspending, after selection of the first power source position is urged at the urging step until the first power source position is actually selected, releasing of the parking position by the shift position selecting unit.

By this arrangement, when an operation is made to cancel the parking position while the second power source position turning off the inverter control is selected, cancellation of the parking position can be suspended until switching to the first power source position is made to turn on the inverter control. Therefore, simultaneous selection of the power source position turning off the inverter control and the shift position allowing wheel rotation (allowing towing) can be avoided.

Therefore, a main advantage of the present invention is that a control structure is realized that reliably executes inverter control preventing generation of excessive short-circuit current, even when the motor generator rotates in tow running or the like after short-circuit failure of a power semiconductor switching element forming the inverter device.

BEST MODES FOR CARRYING OUT THE INVENTION

Figure 1:
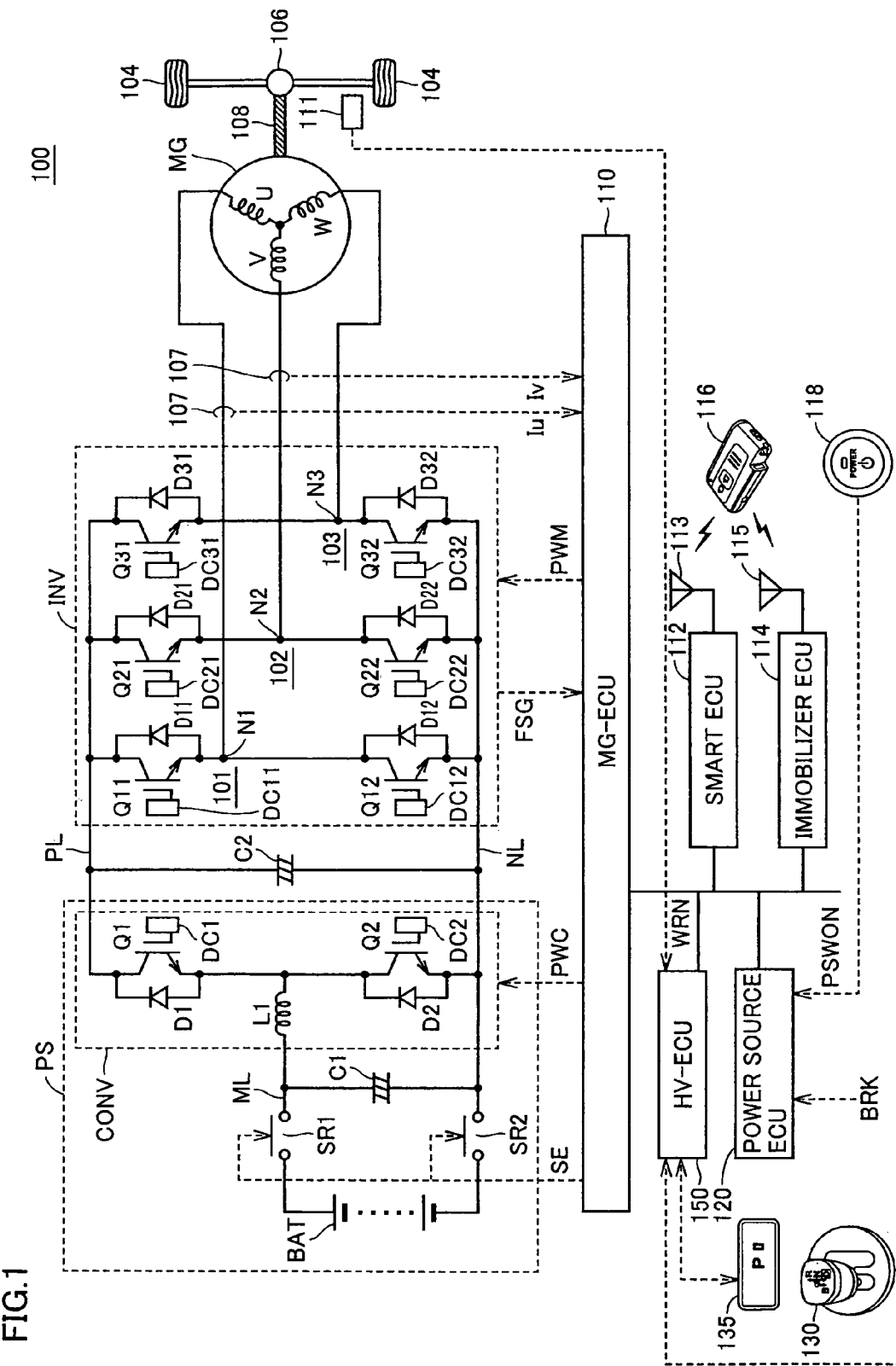
FIG. 1 is a schematic diagram showing a configuration of an electric powered vehicle in accordance with an embodiment of the present invention.

In the following, embodiments of the present invention will be described in detail with reference to the figures. In the following, the same or corresponding portions in the figures are denoted by the same reference characters and, in principle, detailed description thereof will not be repeated.

(Overall Configuration of Electric Powered Vehicle)

FIG. 1 is a schematic diagram of the electric powered vehicle in accordance with an embodiment of the present invention.

Referring to FIG. 1, an electric powered vehicle 100 in accordance with Embodiment 1 of the present invention is an electric powered vehicle adapted to run by the driving force generated by a motor generator MG. Here, a "electric powered vehicle" represents a concept of a vehicle that is adapted to generate driving force from an electric motor (motor) by electric power supplied from a power source apparatus and to rotate a driving wheel and, by way of example, it includes a hybrid vehicle, an electric vehicle and a fuel cell vehicle. In the following, description will be given assuming that the electric powered vehicle 100 is a hybrid vehicle. Specifically, the electric powered vehicle 100 is capable of running with the driving force generated by an engine, not shown, and also capable of generating power using the driving force from the engine.

Electric powered vehicle 100 includes a power source PS, a smoothing capacitor C2, an inverter device INV, a motor generator MG, driving wheels 104, a differential gear 106, and a driving shaft 108.

Power source PS is formed to supply DC power to inverter device INV through a main positive line PL and a main negative line NL. More specifically, power source PS includes a power storage device BAT, system relays SR1 and SR2, a capacitor C1, and a converter unit CONV.

Power storage device BAT is formed to allow charging/discharging with DC power. By way of example, power storage device BAT is implemented by a secondary battery such as a lithium ion battery or a nickel hydride battery, or an electric power storage element such as an electric double layer capacitor.

System relay SR1 is inserted between a positive electrode of power storage device BAT and a positive line ML, and electrically connects or disconnects the positive electrode of power storage device BAT and the positive line ML in accordance with a system command SE. Similarly, system relay SR2 is inserted between a negative electrode of power storage device BAT and main negative line NL, and electrically connects or disconnects the negative electrode of power storage device BAT and the main negative line NL.

Capacitor C1 is connected between positive line ML and main negative line NL, and smoothes charge/discharge voltage of power storage device BAT.

Converter unit CONV is capable of boosting DC power discharged from power storage device BAT and supplying it to inverter device INV, and also capable of lowering DC power regenerated by inverter device IUV and supplying it to power storage device BAT. Specifically, converter unit CONV is formed by a chopper circuit including power semiconductor switching elements (in the following, "switching elements") Q1 and Q2, diodes D1 and D2, and an inductor L1. In converter unit CONV, drive control circuits DC1 and DC2 control on/off of switching elements Q 1 and Q2 in accordance with a switching command PWC, so that switching operation takes place.

Switching elements Q1 and Q2 are connected in series between main positive line PL and main negative line NL. Further, at a connecting node between switching elements Q1 and Q2, one end of inductor L1 is connected. In the present embodiment, switching element is implemented by an IGBT. Alternatively, a bipolar transistor, an MOSFET (Metal Oxide Semiconductor Field Effect Transistor), or a GTO (Gate Turn Off thyristor) may be used.

Diode D1 is connected between the emitter and collector of switching element Q1, allowing a feedback current to flow from the emitter side to the collector side of switching element Q1. Similarly, diode D2 is connected between the emitter and collector of switching element Q2, allowing a feedback current to flow from the emitter side to the collector side of switching element Q2.

Inductor L1 is inserted between a connection node of switching elements Q1 and Q2 and positive line ML, and by the current generated in response to the switching operations of switching elements Q1 and Q2, repeatedly stores and discharges electromagnetic energy. Specifically, by the repetition of storage and discharge of electromagnetic energy by inductor L1, converter unit CONV realizes a boosting operation or a voltage lowering operation.

Capacitor C2 is connected between main positive line PL and main negative line NL, and smoothes DC power exchanged between power source PS and inverter device INV. Specifically, capacitor C2 functions as a power buffer.

Inverter device INV performs power exchange between power source PS and motor generator MG. Specifically, inverter device INV is capable of converting the DC power supplied from power source PS through main positive line PL and main negative line NL to three-phase AC power having three-phase voltages (U-phase voltage, V-phase voltage and W-phase voltage), and capable of converting the three-phase AC power supplied from motor generator MG to DC power. Specifically, inverter device INV includes a U-phase arm circuit 101, a V-phase arm circuit 102 and a W-phase arm circuit 103.

U-phase arm circuit 101 includes a switching element Q11 as an upper arm element and a switching element Q12 as a lower arm element, connected in series between main positive line PL and main negative line NL, and diodes DI1 and D12 connected in anti-parallel with switching elements Q11 and Q12, respectively. In U-phase arm circuit 101, drive control circuits DC11 and DC12 control on/off of switching elements Q11 and Q12 in accordance with the switching command PWM, so that a switching operation takes place. U-phase voltage generated at connection node N1 by the switching operation is supplied to motor generator MG.

Diode D11 is connected between the emitter and the collector of switching element Q11 so as to allow feedback current to flow from the emitter side to the collector side of switching element Q11. Similarly, diode D12 is connected between the emitter and the collector of switching element Q12 so as to allow feedback current to flow from the emitter side to the collector side of switching element Q12. Specifically, diodes D11 and D12 are connected in anti-parallel to allow current flow from main negative line NL to main positive line PL and cuts current flow from main positive line PL to main negative line NL.

Diodes D11 and D12 as such function to suppress surge generated immediately after a transition from the on state to the off state of switching elements Q11 and Q12, respectively. Therefore, in a normal switching operation, no current flows from main positive line PL or main negative line NL to diodes D11 and D12.

Similarly, V-phase arm circuit 102 includes a switching element Q21 as an upper arm element and a switching element Q22 as a lower arm element, connected in series between main positive line PL and main negative line NL, and diodes D21 and D22 connected in anti-parallel with switching elements Q21 and Q22, respectively. V-phase arm circuit 102 generates a V-phase voltage at a connection node N2, and supplies it to motor generator MG.

Similarly, W-phase arm circuit 103 includes a switching element Q31 as an upper arm element and a switching element Q32 as a lower arm element, connected in series between main positive line PL and main negative line NL, and diodes D31 and D32 connected in anti-parallel with switching elements Q31 and Q32, respectively. W-phase arm circuit 103 generates a W-phase voltage at a connection node N3, and supplies it to motor generator MG.

Similar to switching elements Q1 and Q2 described above, switching elements Q11 to Q32 may be implemented by any of IGBT, bipolar transistor MOSFET and GTO. In the present embodiment, as an example, the switching element is formed by an IGBT.

In V-phase arm circuit 102 and W-phase arm circuit 103 also, drive control circuits DC21, DC22, DC31 and DC 32 control on/off of switching elements Q21, Q22, Q31 and Q32, in accordance with the switching command PWM. Each drive control circuit DC (generally representing DC1, DC2, DC11 to DC32) is capable of detecting a state of a corresponding switching element Q (generally representing Q1, Q2, Q11 to Q32), and in case of a failure, it outputs a failure detection signal FSG. The failure detection signal FSG includes information representing the contents of failure (identification of short-circuit failure, an open fault and the like). Failure detection signal is transmitted at least to MG-ECU 110.

Motor generator MG generates driving force in accordance with the three-phase AC power supplied from inverter device INV, and drives driving wheels 104 to rotate, through mechanically coupled driving shaft 108 and differential gear 106. Specifically, motor generator MG is formed to allow transmission of rotational force to/from the driving wheels 104.

Further, if it is desired to allow an output of an engine, not shown, to drive and rotate driving wheels 104, a power split device using a planetary gear mechanism, for example, may be inserted in a driving force transmission path from motor generator MG, so that the driving force generated by motor generator MG and the engine is distributed appropriately.

Typically, motor generator MG is formed by a three-phase permanent magnet type synchronous electric motor. Specifically, on a rotor of motor generator, not shown, a permanent magnet is attached. Therefore, when the rotor rotates, magnetic flux changes with time and position in motor generator MG, resulting in back electromotive force that is in proportion to the number of rotations of the rotor. On a stator (not shown) of motor generator MG, three-phase coil windings of U, V and W phases, each having one end connected to connection nodes N1 to N3, respectively, are wound, and the other end of the coil windings of respective phases are connected together at a neutral point.

Electric powered vehicle 100 further includes a current sensor 107, an MG-ECU (Electrical Control Unit) 110, a wheel speed sensor 111, a smart ECU 112, an immobilizer ECU 114, transmission/reception antennas 113 and 115, a power switch 118, a power source ECU 120, a shift lever 130, a P position switch 135, and an HV-ECU 150 for overall control of electric powered vehicle 100. These ECUs are connected by a communication path to allow exchange of signals and data to/from each other. Though each of the ECUs are described as separate ECU in the present embodiment, functions of a plurality of ECUs may appropriately be integrated in a single ECU. For instance, the functions of MG-ECU 110 and HV-ECU 150 may be integrated and provided by a single ECU.

Current sensor 107 is provided corresponding to at least two of the U-, V- and W-phases. The phase current detected by current sensor 107 is input to MG-ECU 110.

The current of a phase for which current sensor 107 is not provided can be found by a calculation at MG-ECU 110, as the sum of instantaneous values of phase currents Iu, Iv and Iw is zero. By way of example, in FIG. 1, the value Iw can be obtained by calculating Iw=−(Iu+Iv). In order to improve reliability, current sensor 107 may be provided for each phase.

MG-ECU 110 operates in accordance with a power source position set by power source ECU 120 and, when in operation, executes a program stored in advance to control mainly the converter unit CONV and the inverter device INV such that motor generator MG operates in accordance with an operation command (torque command value, rotation number command value and so on) from HV-ECU 150. Specifically, MG-ECU 110 generates, based on the current of each phase detected by current sensor 107 and rotor rotation angle of motor generator MG detected by a rotation angle sensor, not shown, switching commands PWC and PWM for controlling switching operation of inverter device INV and converter unit CONV, that is, controlling on/off of each of the switching elements Q1, Q2 and Q11 to Q32.

HV-ECU 150 operates in accordance with the power source position set by power source ECU 120 and, when in operation, executes a program stored in advance to perform arithmetic operations based on signals transmitted from various sensors, not shown, state of running, change ratio of accelerator position, state of charge of the power storage device, a stored map and the like. Thus, HV-ECU 150 generates an operation command of motor generator MG as a part of overall vehicle control to have the electric powered vehicle attain desired state of driving, in accordance with an operation by the driver.

Wheel speed sensor 111 detects wheel speed of driving wheel 104 and outputs the detected result as rotation number WRN to HV-ECU 110. By way of example, wheel speed sensor 111 detects the wheel speed based on change of magnetic flux caused by a gear-shaped rotor member attached to a rotation shaft of driving wheel 104.

Power switch 118 is arranged, for example, on an instrument panel in front of a driver's seat, and used for starting operation of electric powered vehicle 100. When operated (pressed) by the driver, power switch 118 outputs an operation signal PSWON to power source ECU 120.

Power source ECU 120 sets a power source position for determining a group of devices to which power is to be supplied, among devices on the vehicle, in response to the operation signal PSWON of power switch 118 and an operation signal BRK of a brake pedal (not shown). Setting of power source position will be described in detail later. Briefly, when the driver inserts a key 116 to a prescribed slot and presses power switch 118, the setting of power source position by power source ECU 120 is released from power-OFF state and transition of power source position takes place, whereby electric powered vehicle 100 is set to an operable state.

Immobilizer ECU 114 is capable of wireless communication with key 116 held by the driver through transmission/reception antenna 115, compares an ID code stored in key 116 with the ID code stored in itself and, only when these IDs match, permits cancellation of the power-OFF state by the power source ECU 120.

In electric powered vehicle 100 in accordance with the present embodiment, it is possible to detect occurrence of a short-circuit in each of the switching elements Q11 to Q32 forming the inverter device INV, by a failure detection signal FSG from each drive control circuit DC. It is also possible to detect occurrence of a short-circuit of each switching element forming the inverter device INV, based on a comparison of phase current values Iu, Iv and Iw detected by current sensor 107 and phase currents supposed to flow in respective modes of switching command PWM, by MG-ECU 110. By these methods, MG-ECU 110 and HV-ECU 150 are capable of detecting occurrence of a short-circuit and recognition of the short-circuited switching element, among the switching elements Q11 to Q32 forming the inverter device INV. Further, if a power source position allowing normal inverter control is selected by power source ECU 120, on/off of remaining normal switching elements can be controlled in accordance with the switching command PWM from MG-ECU 110.

(Setting of Power Source Position)

Setting of power source position by power source ECU 120 will be described.

Figure 2:
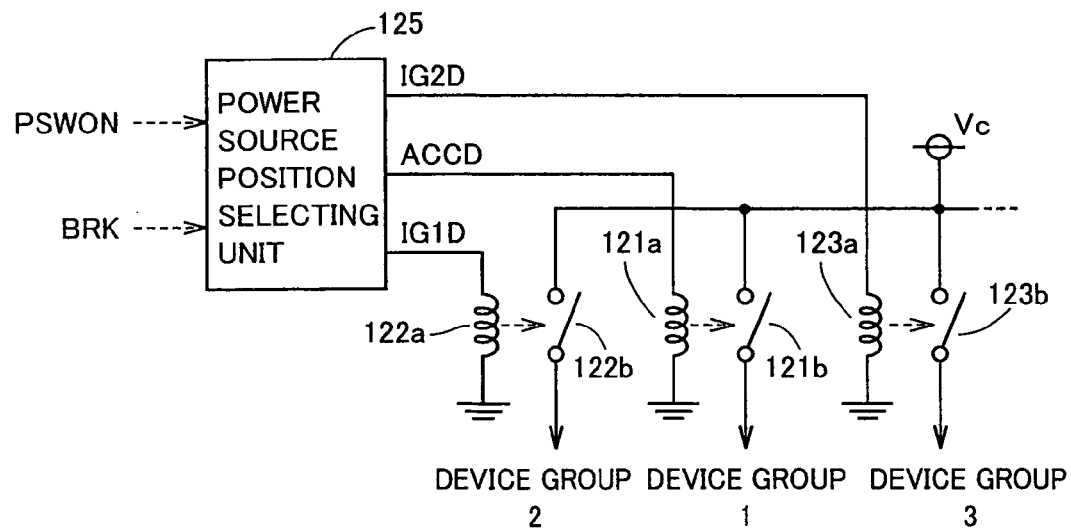
FIG. 2 is a block diagram illustrating control of devices to which power is supplied, by a power source ECU.

Referring to FIG. 2, a power source position selecting unit 125 corresponds to a functional block realized by software processing or hardware processing of power source ECU 120, and in response to the operation signal PSWON of power switch shown in FIG. 1 and the operation signal BRK of brake pedal (not shown), it selects and sets one power source position among a plurality of power source positions. Power source position selecting unit 125 sets relay selecting signals ACCD, IG1D and ID2D in accordance with the set power source position, and thereby controls on/off of relays 121b to 123b controlling power supply to the group of devices mounted on the vehicle, by controlling power conduction to relay coils 121a to 123a.

Figure 3:
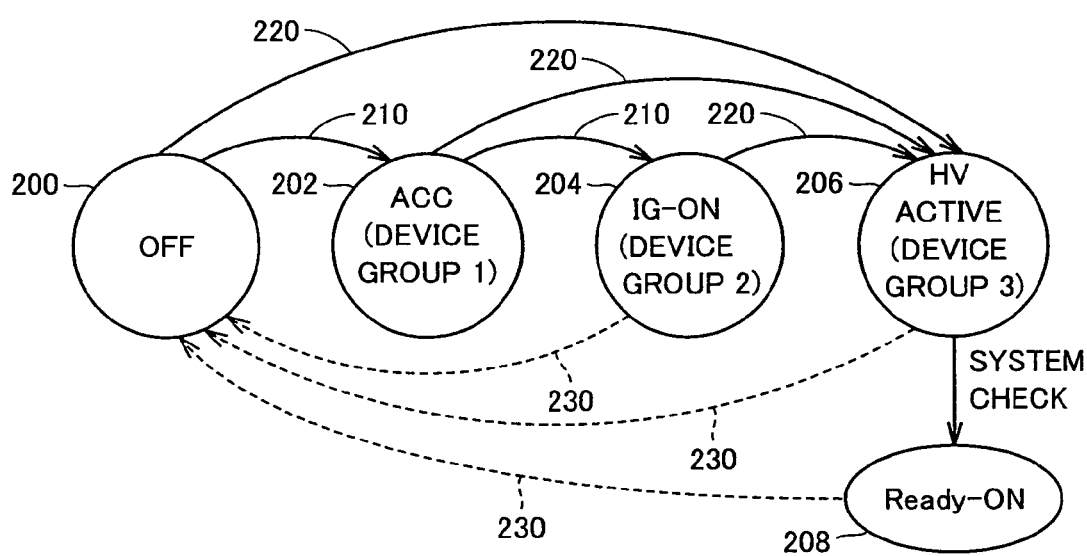
FIG. 3 shows transitions of power source positions set by the power source ECU.

Referring to FIG. 3, power source position includes an OFF position 200, an ACC (accessory) position 202, an IG-ON position 204, an HV activation position 206 and a Ready-On position 208.

OFF position 200 corresponds to a power-OFF state, and at this power source position, power supply to each device mounted on the vehicle is cut off. At ACC position 202, power is supplied to accessory devices such as audio instrument and air conditioner. At IG-ON position 204, power is additionally supplied to devices necessary for vehicle running. When HV-activation position 206 is selected, a system is activated to set electric powered vehicle 100 to a state ready for running. After system activation, system check is executed and if conditions for running are satisfied, the position is changed to Ready-ON position 208. Thus, electric powered vehicle 100 is ready to run in response to an operation of an accelerator pedal.

At the Ready-ON position 208, system relays SR1 and SR2 shown in FIG. 1 are on, and control of converter unit CONV and inverter device INV is executable. Therefore, in the present embodiment, Ready-ON position 208 corresponds to the "first power source position" at which inverter control is possible, and other power source positions correspond to the "second power source position" at which inverter control is impossible. In the following, power source positions other than Ready-ON position are sometimes generally referred to as the "Ready-OFF position."

Power source position changes from OFF position 200 to ACC position 202 and to IG-ON position 204 in this order as represented by arrows 210, every time power switch 118 (FIG. 1) is operated (pressed) without any brake pedal operation.

Further, when power switch 118 is operated while the brake pedal is pressed at OFF position 200, ACC position 202 or IG-ON position 204, the power source position is changed to HV activation position 206, as represented by arrows 220.

From OFF position 200 or ACC position 202, transition to HV activation position 206 is possible.

When power switch 118 is operated at IG-ON position 204, HV activation position 206 or Ready-ON position 208, power source position is changed to OFF position 200, as represented by arrows 230. Specifically, when the driver operates power switch 118 at Ready-ON position 208, a transition request to the Ready-OFF position (Ready-OFF request) is made.

Again referring to FIG. 2, at OFF position 200, power position selecting unit 125 turns off each of relay control signals IG1$d$, ACCD and IG2$d$. As a result, power is not conducted to any of relay coils 121$a$ to 123$a$ and, hence, relays 121$b$ to 123$b$ are turned off. Therefore, supply of power supply voltage Vc to each device mounted on the vehicle is cut off.

When ACC position is selected, power source position selecting unit 125 turns on the relay control signal ACCD and turns off IG1$d$ and IG2$d$. As a result, relay coil 121$a$ is conducted and relay 121$b$ is turned on, while relays 122$b$ and 123$b$ are turned off. Thus, power supply to accessory devices (device group 1) including audio instrument, room lamp and air conditioner starts.

Further, when IG-ON position is selected, IG1$d$ is turned on in addition to relay control signal ACCD. As a result, relays 121$b$ and 122$b$ are turned on and, in addition to device group 1, power supply voltage Vc is supplied to device group 2 necessary for vehicle running. Further, when HV activation position 206 is selected, each of relay control signals ACCD, IG1$d$ and IG2$d$ is turned on, and each of the relays 121$b$ to 123$b$ is turned on. In response to power supply to a device group 3 upon turning-on of relay 123$b$, the system is activated so that electric powered vehicle 100 is set to a state ready to run.

(Setting of Shift Position)

Next, selection of a shift position in electric powered vehicle 100 will be described.

Figure 4:
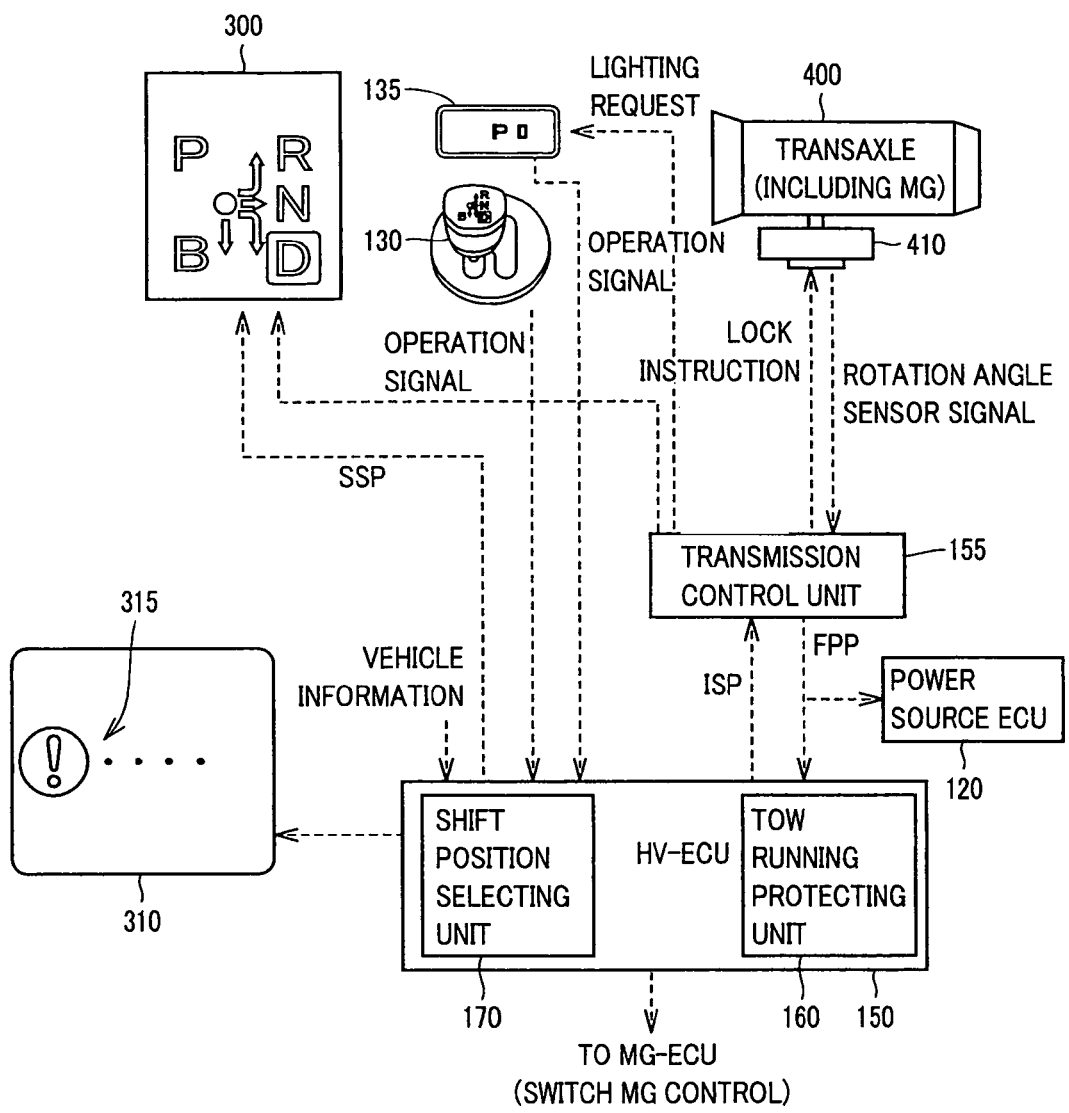
FIG. 4 is a block diagram illustrating an arrangement for selecting shift position in the electric powered vehicle in accordance with an embodiment of the present invention.

Referring to FIG. 4, the driver may select any of a reverse position (R position), a neutral position (N position), a drive position (D position) and a brake position (B position), by an operation of a shift lever 130. Further, by an operation (pressing) of a P position switch 135 for selecting a parking position (P position) by a one-touch operation, the P position can be selected.

To HV-ECU 150, pieces of vehicle information detected by various sensors, and operation signals of shift lever 130 and P position switch 135 are input.

HV-ECU 150 includes a tow running protecting unit 160 and a shift position selecting unit 170. Tow running protecting unit 160 and shift position selecting unit 170 correspond to a functional block realized by software processing or hardware processing of HV-ECU 150.

Shift position selecting unit 170 selects as the shift position, one of the P position, B position, R position, N position and D position, in accordance with the operation signal of shift lever 130 and the operation signal of P position switch 135.

On a meter panel 300, the current shift position is displayed, in accordance with a shift position signal SSP indicating the selected shift position. Further, when the P position is selected, HV-ECU 150 outputs a P position selecting signal ISP to a transmission control unit 155.

On a transaxle 400 including motor generator MG, a parking lock mechanism 410 that is activated when the P position is selected, is provided. On parking lock mechanism 410, an actuator, typically formed of a motor, is arranged. In response to a rotation angle sensor signal from the actuator, transmission control unit 155 controls activation/inactivation of parking lock mechanism 410.

In response to the P position selecting signal ISP, transmission control unit 155 applies an activation instruction (lock instruction) to parking lock mechanism 410 so that the parking lock mechanism is activated. Further, transmission control unit 155 outputs a lighting request to turn on a light indicating that the P position is being selected, to P position switch 135.

Further, transmission control unit 155 generates a P position state signal FPP indicating that the parking lock mechanism is in the active state. P position state signal FPP is input to power source ECU 120 and HV-ECU 150.

Tow running protecting unit 160 controls the power source position and the shift position such that, when short-circuit failure occurred in one or more of the switching elements of the inverter device INV, towing with inappropriate power source position kept selected can be avoided. The operation of tow running protecting unit 160 will be described in detail later.

Further, in response to a control instruction from HV-ECU 150, it is possible to output a warning message 315 to the driver, on a display panel portion 310. The warning message is not limited to character display, and warning may be given by voice or sound to the driver.

(Process after Occurrence of Short-Circuit Failure)

Next, a process when a short-circuit failure occurs in one or more switching elements of the inverter device INV will be described.

Figure 5:
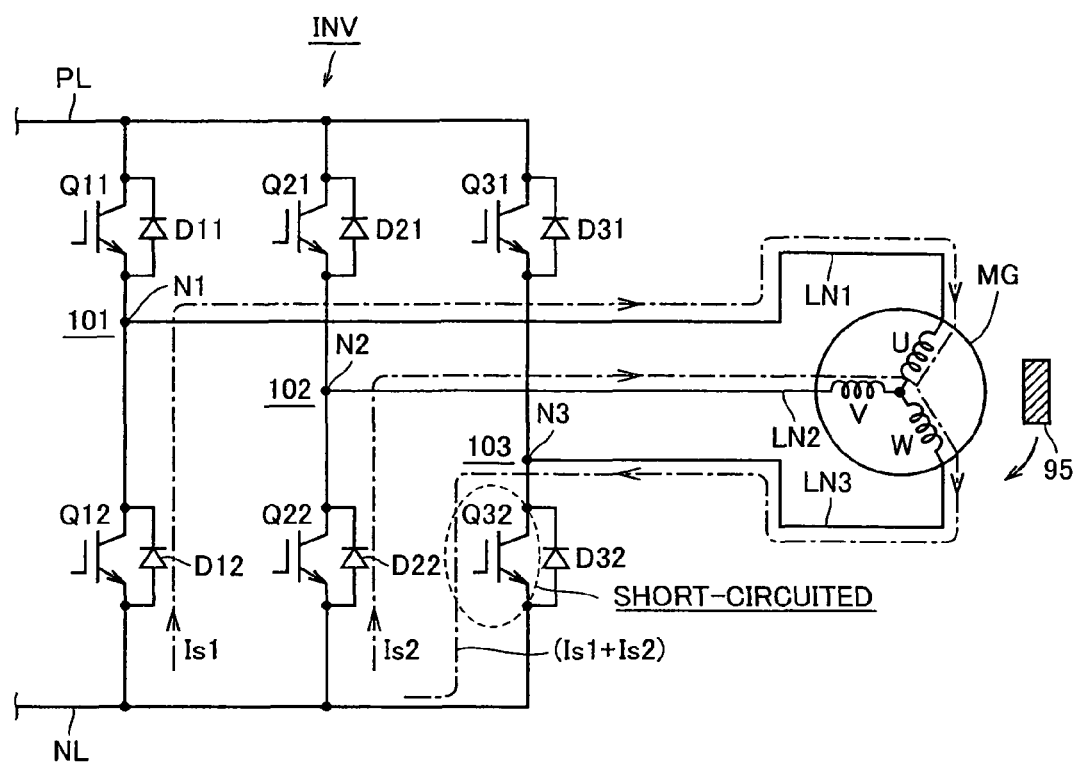
FIG. 5 is a circuit diagram illustrating a short-circuit current path when a short-circuit failure occurs in the inverter device.

Referring to FIG. 5, when driving wheel 104 (FIG. 1) of electric powered vehicle 100 rotates as the vehicle is towed, for example, a rotor of motor generator MG mechanically coupled to driving wheel 104 rotates. As the rotor rotates, permanent magnet 95 rotates accordingly and, as a result, magnetic flux interlinked with the coils of respective phases on the stator side changes with time. Because of the change with time of magnetic flux, back electromotive force generates in motor generator MG. The problem of short-circuit current as described above typically arises at the time of towing. Therefore, in the following, a control structure for preventing short-circuit current accompanying motor rotation at the time of short-circuit failure in the inverter device INV will be described as the control for reducing short-circuit current in tow running (tow running protecting control).

If short-circuit occurs in switching element Q32 of W-phase arm circuit 103, a short-circuit current Is1 flows through a current path (short-circuit path) including U-phase arm circuit 101, motor generator MG and W-phase arm 103, because of the back electromotive force. Specifically, antiparallel diode D12 of U-phase arm circuit 101 allows current flow from the side of main negative line NL to the main positive line PL and, therefore, current flows from main negative line NL to U-phase supply line LN1 through connection node N1. Further, as the switching element Q32 is in the short-circuited state, short-circuit current can flow from W-phase supply line LN3 to main negative line NL through connection point N3. As a result, short-circuit current Is1 flows from main negative line NL, through diode D12, connection node N1, U-phase supply line LN1, U-phase coil of motor generator MG, W-phase coil of motor generator MG, W-phase supply line LN3, connection node N3 and switching element Q32 to main negative line NL.

Similarly, short-circuit current Is2 flows through a current path including Y-phase arm 102, motor generator MG and W-phase arm circuit 103. Specifically, short-circuit current Is2 flows from main negative line NL through diode D22, connection node N2, V-phase supply line LN2, V-phase coil of motor generator MG, W-phase coil of motor generator MG, W-phase supply line LN3, connection node N3 and switching element Q32 to main negative line NL.

Therefore, it follows that through switching element Q32, a sum of short-circuit currents Is1 and Is2 flows.

When electric powered vehicle 100 is towed in such a state for a relatively long period of time, excessive short-circuit current flows continuously, possibly damaging coils of respective phases of motor generator MG, diodes existing in the short-circuit path and a supply line connecting the inverter device INV and motor generator MG (for example, wire harness). Therefore, to allow tow running, it is necessary to reduce short-circuit current in such a state.

Therefore, in the electric powered vehicle in accordance with the present embodiment, when the vehicle is towed after occurrence of short-circuit failure, short-circuit current reducing control is executed, in which on/off of remaining normal switching elements of the inverter device INV are appropriately controlled. For instance, if occurrence of short-circuit failure is limited only in one of the upper and lower arm elements of the inverter device INv, that is, when it is limited in one side arm, the arm element of the same side as the short-circuited element is turned on in each phase, by the switching command PWM from MG-ECU 110, whereby short-circuit current reducing control is executed.

Specifically, the arm element of each phase on the same side as the short-circuited switching element Q32 (lower arm element), that is, U-phase lower arm element Q12 and V-phase lower arm element Q22 are turned on under the control of MG-ECU 110, so that the short-circuit current generated by the back electromotive force in tow running comes be split and flow through respective phases, that is, through switching elements Q12, Q22 and Q32. As a result, short-circuit current of each phase decreases, and hence, tow running is possible while avoiding damage to devices such as described above. If a short-circuit occurred in the upper arm element, upper arm elements of other phases that are not short-circuited are turned on under the control of MG-ECU 110, and similar short-circuit current reducing control is possible.

In order to perform such short-circuit current reducing control as described above, it is necessary that on/off control of each of the switching elements Q11 to Q32 by MG-ECU 110, that is, inverter control, is possible. Therefore, in the electric powered vehicle in accordance with the present embodiment, after a short-circuit failure occurred in the inverter device INV, the tow running protection control as described below is executed, in order to avoid towing while power source position other than Ready-ON position is being selected.

FIGS. 6 to 9 are flowcharts illustrating the tow running protection control when short-circuit failure occurs in the electric powered vehicle, in accordance with the embodiment of the present invention. The control process in accordance with the flowcharts of FIGS. 6 to 9 is realized by executing a program stored in advance in HV-ECU 150, for example, in a prescribed period. The control process corresponds to the function of tow running protecting unit 160 shown in FIG. 4.

Figure 6:
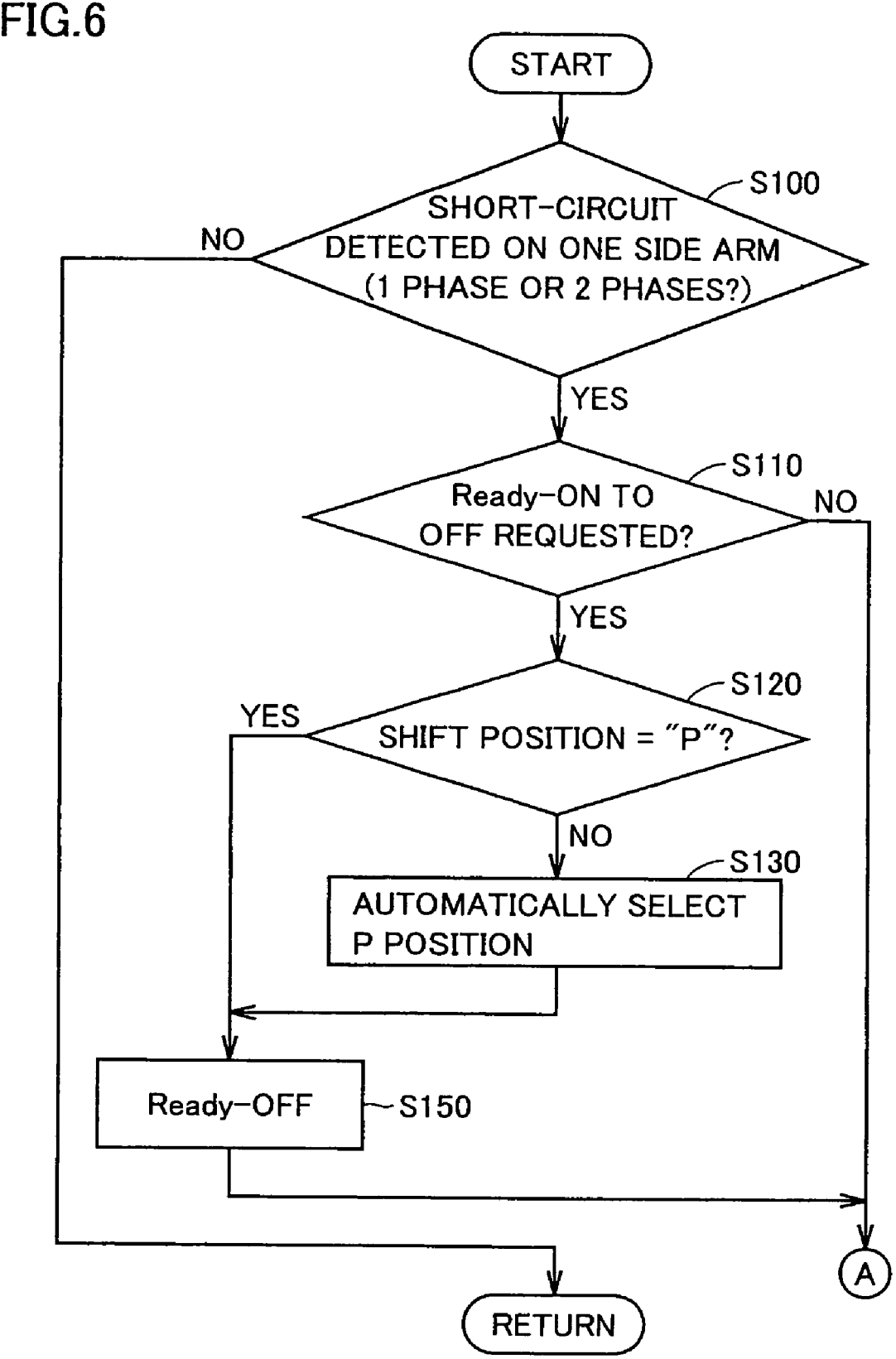
FIG. 6 is a first flowchart illustrating tow running protection control when short-circuit failure occurs in the electric powered vehicle in accordance with an embodiment of the present invention.

Referring to FIG. 6, HV-ECU 150 determines, at step S100, whether short-circuit failure of switching element is detected only on an arm of one side of one or two phases in inverter device INV. The determination at step S100 can be executed in accordance with the result of short-circuit failure detection by MG-ECU 110, based on the failure detection signal FSG ever transmitted from drive control circuit DC or on the phase current values detected by current sensor 107.

If the determination at step S100 is NO, that is, if all switching elements are normal, or if a short-circuit failure of a pattern different from above occurred, the tow control protecting control described in the following is unnecessary and, therefore, HV-ECU 150 ends the program without performing any process thereafter.

When the determination at step S100 is YES, HV-ECU 150 determines whether a transition request (Ready-OFF request) from Ready-ON position to Ready-OFF position has been issued or not, at step S110. Specifically, if power switch 118 is operated while the Ready-ON position is selected, the determination at step S110 is YES and otherwise it is NO.

If it is YES at step S110, that is, when Ready-OFF request is made, HV-ECU 150 determines at step S120 whether or not the current shift position is P position.

When the P position is not selected (determination of NO at step S120), HV-ECU 150 automatically switches selection of shift position to P position at step S130 and, at step S150, instructs power source ECU 120 to switch the power source position to Ready-OFF position. As a result, in accordance with the transition diagram of FIG. 3, power source position makes a transition from Ready-ON position to Ready-OFF position.

On the other hand, if the P position is selected (determination of YES at step S120), control directly proceeds to step S150 at which HV-ECU 150 instructs power source ECU 120 to switch the power source position to Ready-OFF position.

Therefore, if a transition to a power source position turning off the inverter control is made while the shift position at which the parking lock mechanism is inactive, that is, towing is possible, is selected, the shift position can automatically be switched to the P position.

Figure 7:
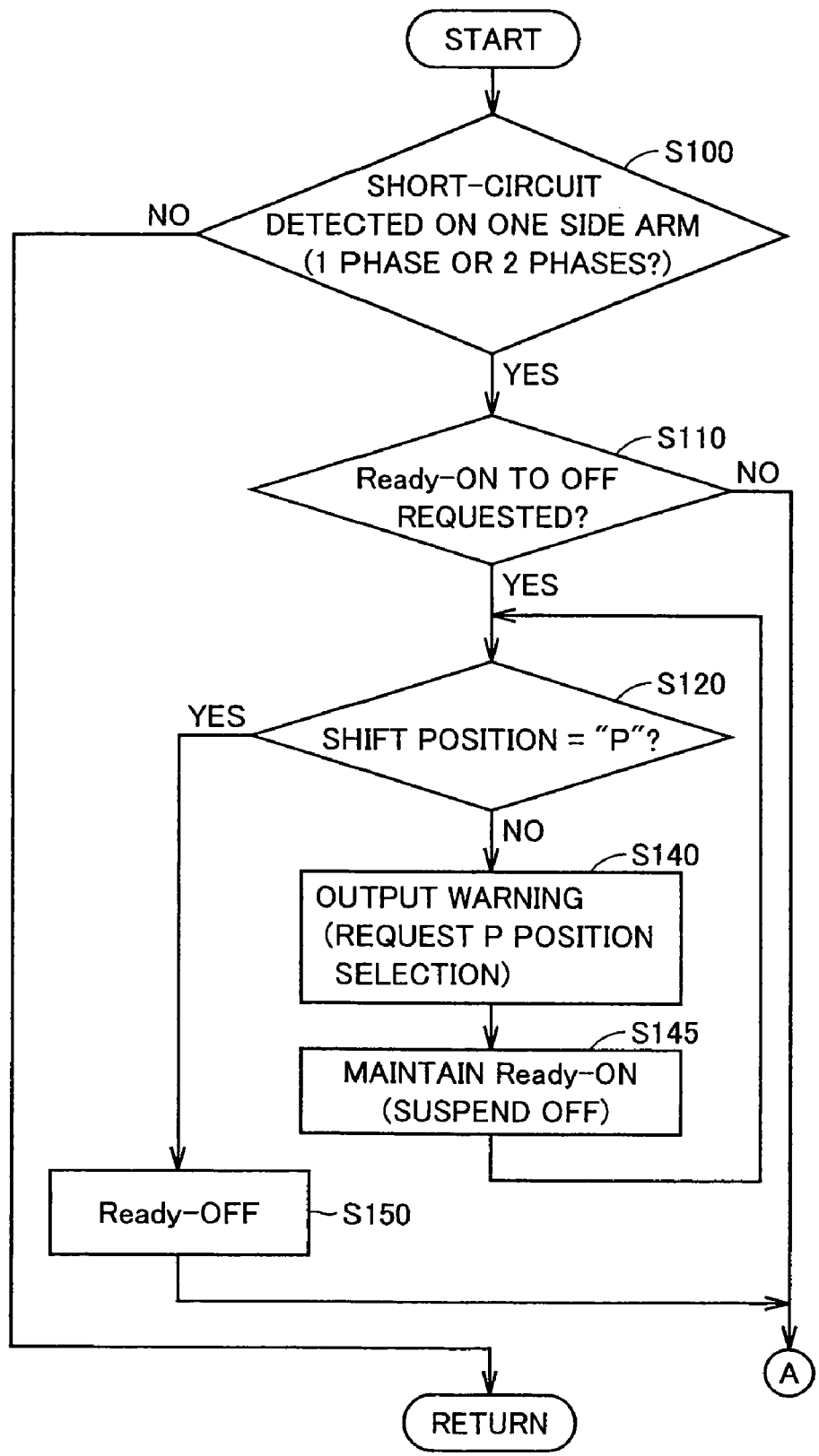
FIG. 7 is a second flowchart illustrating tow running protection control when short-circuit failure occurs in the electric powered vehicle in accordance with an embodiment of the present invention.

Alternatively, a control structure as shown in FIG. 7 may be adopted, in which steps S140 and S145 are executed in place of step S130, if the determination at step S120 of FIG. 6 is NO.

At step S140, HV-ECU 150 outputs a warning to the driver, urging selection of P position. By way of example, such a warning can be output by a warning message 315 shown in FIG. 4. Further, at step S145, HV-ECU 150 instructs power source ECU to maintain the Ready-ON position and suspend Ready-OFF. Until the driver operates P position switch in response to warning message 315 and thereby the shift position is switched to the P position, determination at step S120 is NO, and steps S140 and S145 are executed continuously.

By such a control structure, if an operation to make a transition to the power source position that turns off the inverter control is done while a shift position at which the parking lock mechanism is inactive is selected, transition of the power source position can be suspended until the shift position is switched to the P position.

As described above, in a state in which inverter control is off and execution of the above-described short-circuit current reducing control is impossible, the control shown in FIG. 6 or FIG. 7 avoids towing while a shift position other than the P position is selected.

Next, the process when the determination at step S110 is NO and after step S1150 will be described with reference to FIGS. 8 and 9.

Figure 8:
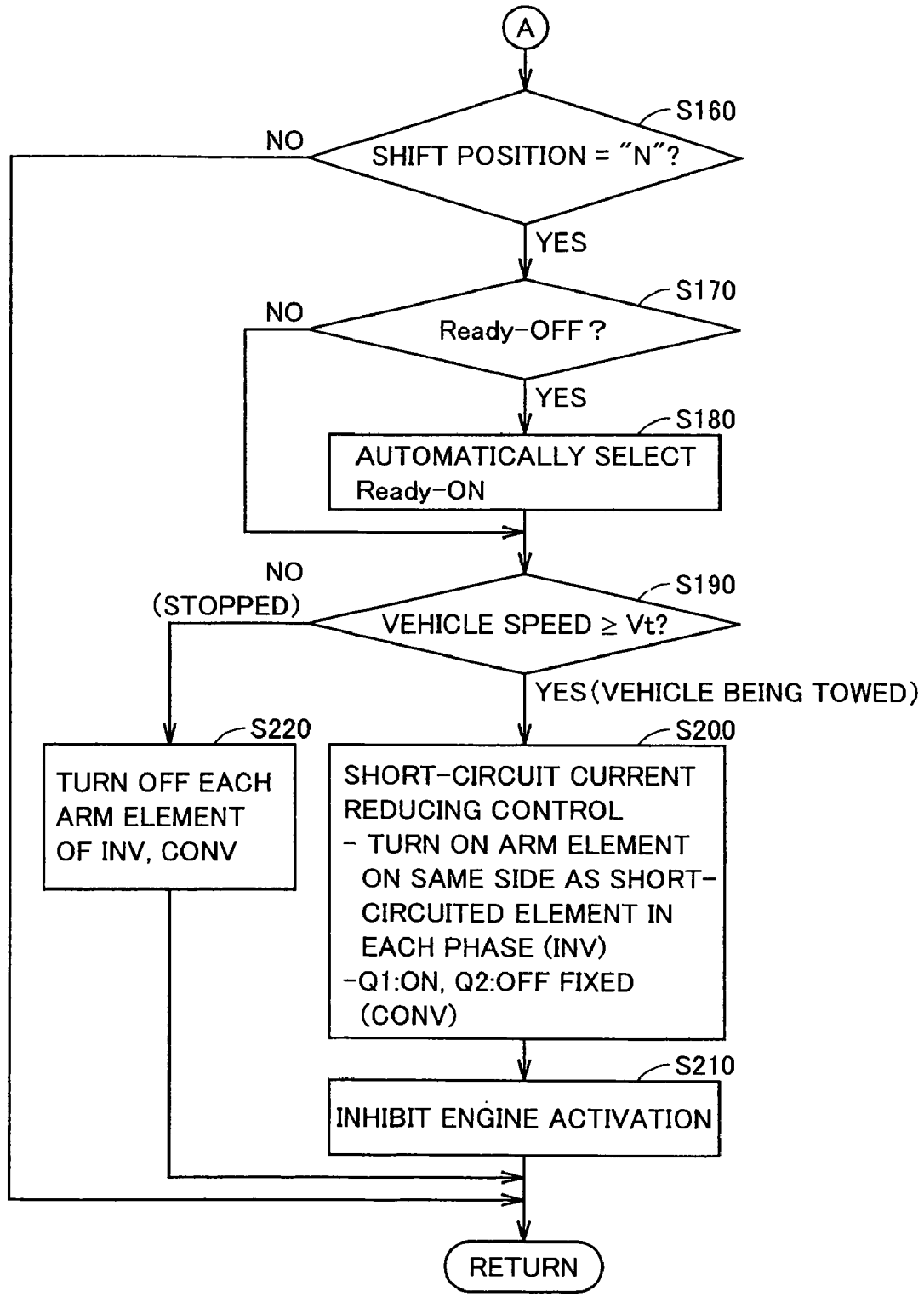
FIG. 8 is a third flowchart illustrating tow running protection control when short-circuit failure occurs in the electric powered vehicle in accordance with an embodiment of the present invention.

Referring to FIG. 8, at step S160, HV-ECU 150 determines whether or not the shift position at which the parking lock is released has been selected by the driver. Typically, at step S160, whether the N position, which is selected to release parking lock and start towing, has been selected or not is determined. If the determination at step S160 is NO, HV-ECU 150 determines that there is no possibility of towing, and ends the program without performing any process thereafter.

If the determination at step S160 is YES, HV-ECU 150 determines that towing is possible, and proceeds to step S170. At step S170, HV-ECU 150 determines whether the current power source position is Ready-OFF position or not.

If the power source position is Ready-OFF position (determination of YES at step S170), control proceeds to step S180 at which HV-ECU 150 instructs power source ECU 120 to cause automatic transition of power source position to Ready-ON position. If the determination at step S170 is NO, HV-ECU 150 instructs power source ECU 120 to maintain the current power source position, that is, Ready-ON position.

Consequently, when a shift position at which towing may possibly be performed is selected, the power source position is automatically set to Ready-ON position, to allow inverter control.

Further, at step S190, HV-ECU 150 compares the vehicle speed of electric powered vehicle 100 with determination value Vt based on the output of wheel speed sensor 111, and determines whether the vehicle is towed or stopped.

When vehicle speed<Vt and the vehicle is stopped (determination of NO at step S190), HV-ECU 150 generates, at step S220, switching commands PWC and PWM, to turn off respective arm elements (switching elements) of inverter device INV and converter unit CONV.

When vehicle speed≧Vt and the vehicle is being towed (determination of YES at step S190), HV-ECU 150 instructs, at step S200, to MG-ECU 110 to generate a switching command PWM for executing the short-circuit current reducing control described above to inverter device INV and a switching command PWC for turning on the switching element Q1 and turning off the switching element Q2, to converter unit CONV. Consequently, in inverter device INV, the arm element on the same side as the short-circuited switching element is rendered conductive in each phase. Further, at step S210, HV-ECU 150 inhibits engine activation.

At step S200, in addition to the short-circuit current reducing control described above, excessive charging protection control of electric storage device BAT may be performed. Specifically, if the voltage of smoothing capacitor C2 becomes excessively large or if the SOC (State Of Charge) of electric storage device BAT exceeds a prescribed value, system relays SR1 and SR2 may be turned off to protect the electric storage device BAT from excessive charging. In addition to the excessive charge protection control, it is preferred to perform control of lowering the voltage of main positive line PL, by operating other devices (such as another motor generator for power generation) that operate receiving power supply from the main positive line PL and the main negative line NL.

By such a control structure, it becomes possible when the shift position at which parking lock is released is selected by the driver, to automatically set Ready-ON position allowing inverter control. Therefore, while the vehicle is towed, the short-circuit current can be reduced by inverter control. Therefore, tow running is possible without causing further damage to the devices.

Figure 9:
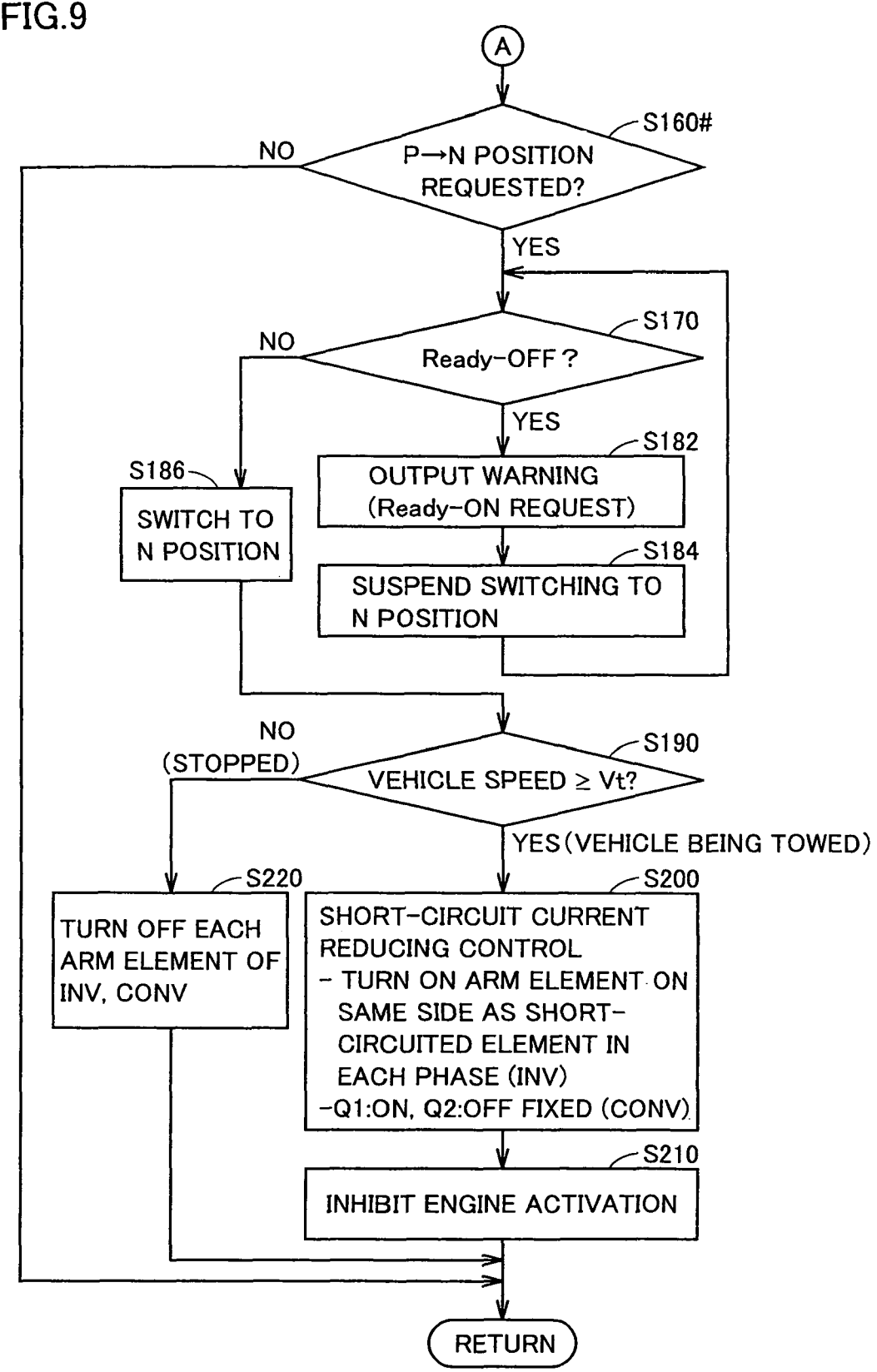
FIG. 9 is a fourth flowchart illustrating tow running protection control when short-circuit failure occurs in the electric powered vehicle in accordance with an embodiment of the present invention.

Alternatively, a control structure such as shown in FIG. 9 may be adopted, in which in place of step S160 of FIG. 8, step S160# is executed, and in place of step S180, steps S182, S184 and S186 are executed.

HV-ECU 150 determines, at step S160#, whether or not the shift position for releasing parking lock has been selected by the driver. Typically, at step S160, whether a shift lever is operated to request switching to N position, which is selected for towing, from the P position has been made or not is determined. If the determination at step S160# is NO, HV-ECU 150 determines that there is no possibility of towing and, the program ends without executing any process thereafter.

If the determination at step S160# is YES, HV-ECU 150 executes step S170 as in FIG. 8, and if the determination is YES, that is, if the position is Ready-OFF, outputs at step S182 a warning to change the power source position to Ready-ON by warning message 315 shown in FIG. 4 or the like, to the driver. Further, at step S184, HV-ECU 150 maintains the P position and suspends switching of shift position to the N position. Until the driver operates power switch 118 and the power source position is switched to Ready-ON, the determination at step S170 is always YES and, therefore, steps S182 and S186 are executed continuously.

Only when the determination at step S170 is NO, that is, when the position is Ready-ON, HV-ECU 150 accepts the shift position switching request at step S186 and switches the shift position to the N position.

This control structure prevents setting of a shift position (N position) for towing while Ready-OFF position, at which inverter control is impossible, is being selected by the parking position releasing operation by the driver. In this manner, by the control process by tow running protecting unit 160 described above, overlapped selection of Ready-OFF position and the shift position (typically, N position) at which parking lock mechanism is inactive, that is, towing is possible, can be prevented. Specifically, tow running protecting unit 160 shown in FIG. 4 corresponds to the "overlapped state avoiding unit" of the present invention.

In the flowchart of FIGS. 6 to 9, steps S130 and S180 correspond to the "automatic selecting unit" of the present invention, and steps S140 and S182 correspond to the "warning unit" of the present invention. Further, steps S145 and S184 correspond to the "suspending unit" of the present invention, and step S190 corresponds to the "instructing unit" of the present invention.

As described above, in the electric powered vehicle in accordance with an embodiment of the present invention, simultaneous selection of the power source position (Ready-OFF position) in which inverter control is turned off and the shift position allowing towing at which the parking lock mechanism is inactive, can be prevented. Accordingly, when the vehicle is towed, the short-circuit current reducing control by the inverter device INV can reliably be executed. Therefore, in tow running when a switching element forming the inverter device INV is short-circuited, generation of excessive short-circuit current can be prevented and, hence, damage to the devices can be prevented.

In the foregoing, control for reducing short-circuit current during towing has been described as a typical example in which short-circuit current after occurrence of short-circuit failure in the inverter device poses a problem. It is noted that similar control structure also prevents generation of excessive short-circuit current by the back electromotive force of motor generator MG other than in the tow running.

Although the present invention has been described and illustrated in detail, it is clearly understood that the same is by way of illustration and example only and is not to be taken by way of limitation, the scope of the present invention being interpreted by the terms of the appended claims.

INDUSTRIAL APPLICABILITY

The present invention is applicable to an electric powered vehicle mounting an AC electric motor generator for running.

The invention claimed is:

1. An electric powered vehicle, comprising:
an AC electric motor generator having a rotor with a magnet attached, and configured to allow alternate transmission of rotating force to/from a wheel;
an inverter device having a plurality of power semiconductor switching elements, and configured to convert a DC voltage of a power source to a driving voltage for said AC electric motor generator;
a controller for controlling said inverter device;
a shift position selecting unit for selecting one of a plurality of shift positions including at least a parking position, in accordance with an operation by a driver;
a parking lock mechanism activated when said parking position is selected; and
a power source position selecting unit for selecting one of a plurality of power source positions determining a group of devices to be objects of power supply among devices mounted on the vehicle, in accordance with an operation by the driver; wherein
said plurality of power source positions include a first power source position allowing control of said power semiconductor switching element by said controller and a second power source position not allowing said control;
said electric powered vehicle further comprising
an overlapped state avoiding unit for avoiding a state in which selection of said second power source position and selection of a shift position at which said parking lock mechanism is inactive are overlapped, when a short-circuit failure of any of said plurality of power semiconductor switching elements has been detected.

2. The electric powered vehicle according to claim 1, wherein
said plurality of power semiconductor switching elements are arranged as upper and lower arm elements of a plurality of phases forming said inverter device; and
when said short-circuit failure has been detected and the vehicle is towed, said controller performs short-circuit current reducing control by turning on, in each phase at which said short-circuit failure has not occurred among said plurality of phases, an arm element of the same side as the short-circuited power semiconductor switching element, among said upper and lower arm elements.

3. The electric powered vehicle according to claim 2, further comprising
an instructing unit recognizing, when vehicle speed of said electric powered vehicle attains to a prescribed speed or higher when said first power source position is selected and a neutral position is selected as said shift position, that said vehicle is being towed, and instructing said controller to execute said short-circuit current reducing control.

4. The electric powered vehicle according to claim 1, wherein
said overlapped state avoiding unit includes
a warning unit urging selection of said parking position, when an operation is made to instruct transition from said first power source position to said second power source position while a shift position at which said parking lock mechanism is inactive is selected, and
a suspending unit for suspending, after said warning unit urged selection of said parking position until said parking position is actually selected, transition by said power source position selecting unit from said first power source position to said second power source position.

5. The electric powered vehicle according to claim 1, wherein
said overlapping state avoiding unit includes
an automatic selecting unit causing said shift position selecting unit to automatically select said parking position, when an operation instructing transition from said first power source position to said second power source position is made while a shift position at which said parking lock mechanism is inactive is being selected.

6. The electric powered vehicle according to claim 1, wherein
said overlapped state avoiding unit includes
an automatic selecting unit causing said power source position selecting unit to select said first power source position, when a shift position at which said parking lock mechanism is inactivated is selected while said second power source position is being selected.

7. The electric powered vehicle according to claim 1, wherein
said overlapped state avoiding unit includes
a warning unit for urging selection of said first power source position when an operation releasing said parking position is made while said second power source position is being selected, and
a suspending unit for suspending, after said warning unit urged selection of said first power source position until said first power source position is actually selected, releasing of said parking position by said shift position selecting unit.

8. A method of controlling an electric powered vehicle, wherein
said electric powered vehicle includes
an AC electric motor generator having a rotor with a magnet attached, and configured to allow alternate transmission of rotating force to/from a wheel,
an inverter device having a plurality of power semiconductor switching elements, and configured to convert a DC voltage of a power source to a driving voltage for said AC electric motor generator,
a controller for controlling said inverter device,
a shift position selecting unit for selecting one of a plurality of shift positions including at least a parking position, in accordance with an operation by a driver,
a parking lock mechanism activated when said parking position is selected, and
a power source position selecting unit for selecting one of a plurality of power source positions determining a group of devices to be objects of power supply among devices mounted on the vehicle, in accordance with an operation by the driver; and wherein said plurality of power source positions include a first power source position allowing control of said power semiconductor switching element by said controller and a second power source position not allowing said control;

said control method comprising the steps of:

determining whether or not a short-circuit failure of any of said plurality of power semiconductor switching elements has been detected; and avoiding, when it is determined that said short-circuit failure has been detected, a state in which selection of said second power source position and selection of a shift position at which said parking lock mechanism is inactivated, are overlapped.

9. The method of controlling an electric powered vehicle according to claim 8, wherein said plurality of power semiconductor switching elements are arranged as upper and lower arm elements of a plurality of phases forming said inverter device; and when said short-circuit failure has been detected and the vehicle is towed, said controller performs short-circuit current reducing control by turning on, in each phase at which said short-circuit failure has not occurred among said plurality of phases, an arm element of the same side as the short-circuited power semiconductor switching element, among said upper and lower arm elements.

10. The method of controlling an electric powered vehicle according to claim 9, further comprising the step of recognizing, when vehicle speed of said electric powered vehicle attains to a prescribed speed or higher when said first power source position is selected and a neutral position is selected as said shift position, that said vehicle is being towed, and instructing said controller to execute said short-circuit current reducing control.

11. The method of controlling an electric powered vehicle according to claim 8, wherein said step of avoiding includes the steps of urging selection of said parking position, when an operation is made to instruct transition from said first power source position to said second power source position while a shift position at which said parking lock mechanism is inactive is selected, and suspending, after selection of said parking position is urged at said step of urging until said parking position is actually selected, transition by said power source position selecting unit from said first power source position to said second power source position.

12. The method of controlling an electric powered vehicle according to claim 8, wherein said step of avoiding includes the step of causing said shift position selecting unit to automatically select said parking position, when an operation instructing transition from said first power source position to said second power source position is made while a shift position at which said parking lock mechanism is inactive is being selected.

13. The method of controlling an electric powered vehicle according to claim 8, wherein said step of avoiding includes the step of causing said power source position selecting unit to automatically select said first power source position when a shift position at which said parking lock mechanism is inactivated is selected while said second power source position is being selected.

14. The method of controlling an electric powered vehicle according to claim 8, wherein said step of avoiding includes the steps of urging selection of said first power source position when an operation releasing said parking position is made while said second power source position is being selected, and suspending, after selection of said first power source position is urged at said step of urging until said first power source position is actually selected, releasing of said parking position by said shift position selecting unit.

\* \* \* \* \*